US012602959B2

(12) United States Patent
Tamao et al.

(10) Patent No.: US 12,602,959 B2
(45) Date of Patent: Apr. 14, 2026

(54) VEHICLE STORAGE MANAGEMENT SYSTEM, STORAGE MEDIUM, AND STORAGE MANAGEMENT METHOD

(71) Applicant: TOYOTA JIDOSHA KABUSHIKI KAISHA, Toyota (JP)

(72) Inventors: Junichiro Tamao, Tokyo (JP); Takahiro Utsunomiya, Tokyo (JP); Takumi Horie, Chofu (JP); Tomoaki Karasawa, Matsudo (JP); Norihide Kohmoto, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 230 days.

(21) Appl. No.: 18/505,659

(22) Filed: Nov. 9, 2023

(65) Prior Publication Data

US 2024/0177547 A1 May 30, 2024

(30) Foreign Application Priority Data

Nov. 25, 2022 (JP) ................................ 2022-188341

(51) Int. Cl.
*G07C 5/08* (2006.01)

(52) U.S. Cl.
CPC .................................... *G07C 5/085* (2013.01)

(58) Field of Classification Search
None
See application file for complete search history.

(56) References Cited

U.S. PATENT DOCUMENTS 10,846,955 B2 * 11/2020 Golov .................... G07C 5/085
2018/0349192 A1 * 12/2018 Teshler ................. G06F 9/5027

FOREIGN PATENT DOCUMENTS

JP 2007-164240 A 6/2007

OTHER PUBLICATIONS

Android Open Source (Year: 2022).*

* cited by examiner

*Primary Examiner* — Abdhesh K Jha
(74) *Attorney, Agent, or Firm* — Oblon, McClelland, Maier & Neustadt, L.L.P.

(57) ABSTRACT

A vehicle storage management system includes execution circuitry and a storage. The storage has a dynamic partition, which has been allocated in advance, and a static partition, which has been allocated in advance. The execution circuit is configured to delete data from the dynamic partition when a prescribed time has elapsed since the data was stored in the dynamic partition, reallocate a portion of the dynamic partition as an additional static partition when there is a request to install a new application, and store the new application in the additional static partition.

8 Claims, 3 Drawing Sheets

VEHICLE STORAGE MANAGEMENT SYSTEM, STORAGE MEDIUM, AND STORAGE MANAGEMENT METHOD

BACKGROUND

1. Field

The present disclosure relates to a vehicle storage management system, a storage medium, and a storage management method.

2. Description of Related Art

Japanese Laid-Open Patent Publication No. 2007-164240 discloses a management system for a storage device. This management system allows multiple users to use a common storage device by configuring partitions dedicated to the respective users in the storage device. Each partition has access restrictions in place to prevent users other than the user assigned to that partition from modifying the saved contents.

A storage device installed in a vehicle stores data for which the prohibition of deletion is demanded, such as various applications. To prevent accidental deletion of such data, it is conceivable to configure a dedicated partition with access restrictions in the storage device, as described in the above publication. However, if the storage device contains only dedicated partitions with access restrictions, it would be impossible to write newly downloaded data to the storage device when downloading new data.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In a first general aspect, a vehicle storage management system includes execution circuitry and a storage. The storage includes a dynamic partition allocated in advance as a storage area from which data is deleted when a prescribed time elapses after the data is stored, and a static partition allocated in advance as a storage area in which stored contents are not deleted even when the prescribed time elapses. The execution circuitry is configured to delete data from the dynamic partition when the prescribed time has elapsed since the data was stored in the dynamic partition, reallocate a portion of the dynamic partition as an additional static partition when there is a request to install a new application, and store the new application in the static partition.

In a second general aspect, a non-transitory computer-readable storage medium stores a program that includes instructions to be executed by a vehicle storage management system that includes an execution circuitry. The storage medium includes a dynamic partition allocated in advance as a storage area from which data is deleted when a prescribed time elapses after the data is stored, and a static partition allocated in advance as a storage area in which stored contents are not deleted even when the prescribed time elapses. The instructions cause the execution circuitry to delete data from the dynamic partition when the prescribed time has elapsed since the data was stored in the dynamic partition, reallocate a portion of the dynamic partition as an additional static partition when there is a request to install a new application, and store the new application in the additional static partition.

In a third general aspect, a storage management method is performed by a vehicle storage management system. The storage management system includes an execution circuitry and a storage. The storage includes a dynamic partition allocated in advance as a storage area from which data is deleted when a prescribed time elapses after the data is stored, and a static partition allocated in advance as a storage area in which stored contents are not deleted even when the prescribed time elapses. The storage management method includes causing the execution circuitry to delete data from the dynamic partition when the prescribed time has elapsed since the data was stored in the dynamic partition, reallocate a portion of the dynamic partition as an additional static partition when there is a request to install a new application, and store the new application in the static partition.

According to each of the above-described aspects, a portion of the dynamic partition is reallocated as an additional static partition. This allows a new application to continue to be stored, while securing the dynamic partition, in which data is deleted at intervals of the prescribed time. This configuration reduces the possibility that newly installed applications are deleted against the user's intention.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, except for operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

A vehicle storage management system according to an embodiment will now be described with reference to the drawings.

Overall Configuration of Vehicle

Figure 1:
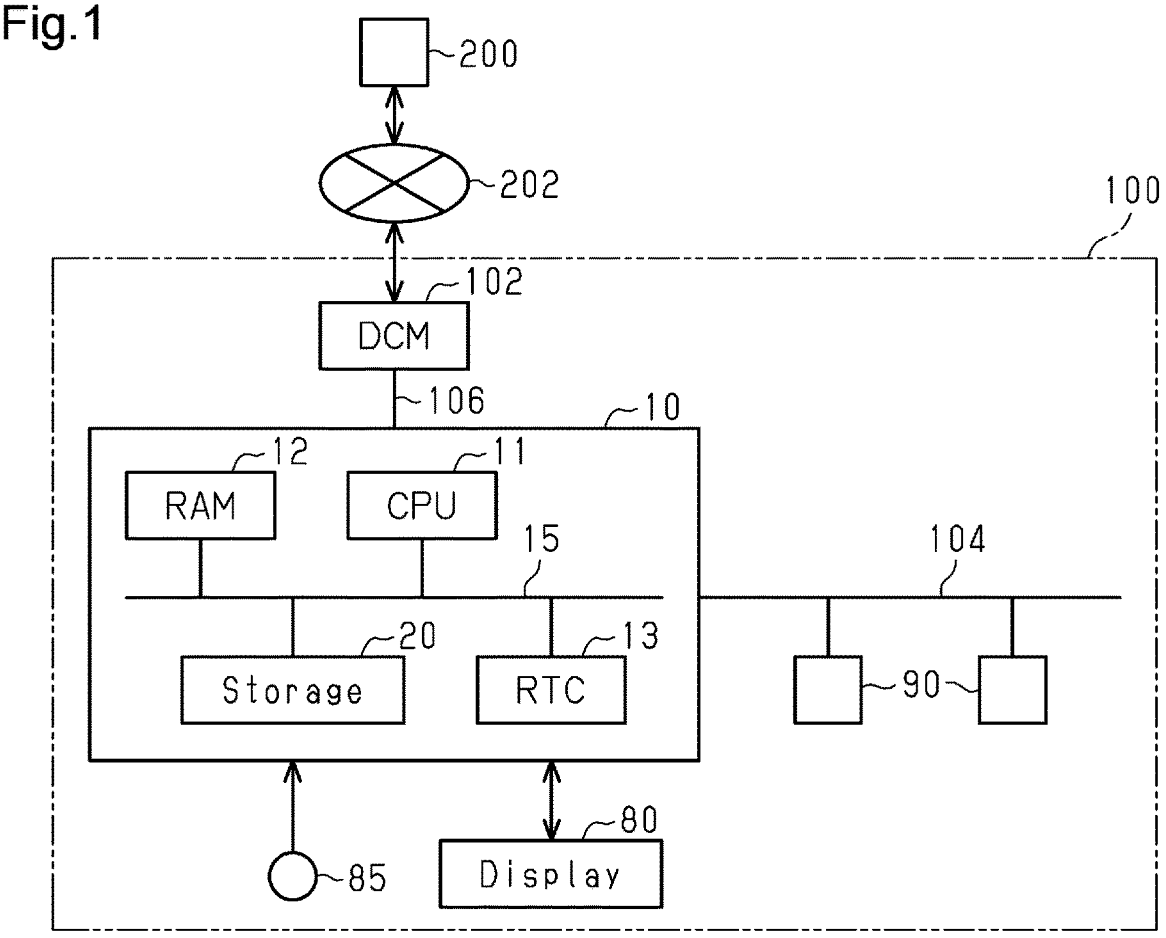
FIG. 1 is a schematic diagram showing a configuration of a vehicle.

As shown in FIG. 1, a vehicle 100 includes a central controller 10, multiple specific controllers 90, and a data communication module 102. The central controller 10 controls the entire vehicle 100 in a centralized manner. Each specific controller 90 is configured to control a specific vehicle on-board device among multiple vehicle on-board devices. An example of the vehicle on-board devices is an engine serving as a drive source of the vehicle 100. Another example of the on-board devices is a hydraulic brake device.

The central controller 10 and the specific controllers 90 can communicate with each other via an external bus 104. The data communication module 102 can communicate with an external server 200 via an external communication network 202. The central controller 10 and the data communication module 102 can communicate with each other via an external bus 106. That is, the central controller 10 can communicate with the external server 200 through the data communication module 102.

The vehicle 100 includes a display 80. The display 80 is located in the passenger compartment. The display 80 is connected to the central controller 10 in a wired or wireless manner. The display 80 can communicate with the central controller 10. The display 80 displays various kinds of information based on command signals from the central controller 10. The display 80 is a touch screen. The display 80 thus also functions as an input device that receives input of information from the outside. The display 80 transmits input information to the central controller 10.

The vehicle 100 includes multiple information acquisition devices 85. FIG. 1 representatively shows one of the information acquisition devices 85. The information acquisition devices 85 acquire various types of information related to the vehicle 100. The various types of information include information on the monitored surroundings of the vehicle 100, information on the driving condition of the vehicle 100, and information on the operating status of the vehicle on-board devices. An example of the information acquisition devices 85 is a camera that captures images of the surroundings of the vehicle 100. Another example of the information acquisition devices 85 is a vehicle speed sensor that detects the traveling speed of the vehicle 100. Another example of the information acquisition devices 85 is a brake pressure sensor that detects the hydraulic pressure of the brake device. Each information acquisition device 85 is connected to the central controller 10 in a wired or wireless manner. Each information acquisition device 85 repeatedly transmits a signal corresponding to the information acquired by itself to the central controller 10.

Overall Configuration of Central Controller

The central controller 10 includes a central processing unit (CPU) 11, a storage 20, a RAM 12, and a real-time clock 13. The CPU 11 includes execution circuitry.

The storage 20 is a NAND-type nonvolatile memory. The storage 20 includes a non-transitory computer-readable storage medium. The storage 20 stores multiple applications. The applications are, for example, various programs for control or management. That is, the storage 20 stores various programs including instructions to be executed by the CPU 11.

The CPU 11 executes applications stored in the storage 20. Thus, the CPU 11 implements various kinds of processing. The RAM 12 is a volatile storage medium that temporarily stores information when the CPU 11 performs processing. The real-time clock 13 is a circuit that generates date and time information. The CPU 11, the storage 20, the RAM 12, and the real-time clock 13 can communicate with each other via an internal bus 15.

The central controller 10, including the CPU 11 and the storage 20, forms a storage management system of the vehicle 100. Although not illustrated, each specific controller 90 includes electronic circuits such as a CPU and a storage, similarly to the central controller 10.

Storage

The storage 20 includes two main types of partitions. One type of partition is a static partition that is allocated in advance as a storage area in which stored contents are not deleted even when a prescribed time T elapses. The other type of partition is a dynamic partition that is allocated in advance as a storage area from which data is deleted when the prescribed time T elapses after the data is stored.

The size of the storage area occupied by these two types of partitions may vary between when the vehicle 100 is shipped from the factory and after the vehicle 100 is shipped. This point will be discussed bellow. Due to the above-described nature of the static partition, data, once written to the static partition, is typically not deleted but stored semipermanently. However, the stored contents of the static partition may be deleted at a dealer or the like at the time of maintenance or inspection of the vehicle 100. The prescribed time T is defined as a time during which the capacity of the dynamic partition can be efficiently reused. The prescribed time T is, for example, several days to several months.

Figure 2:
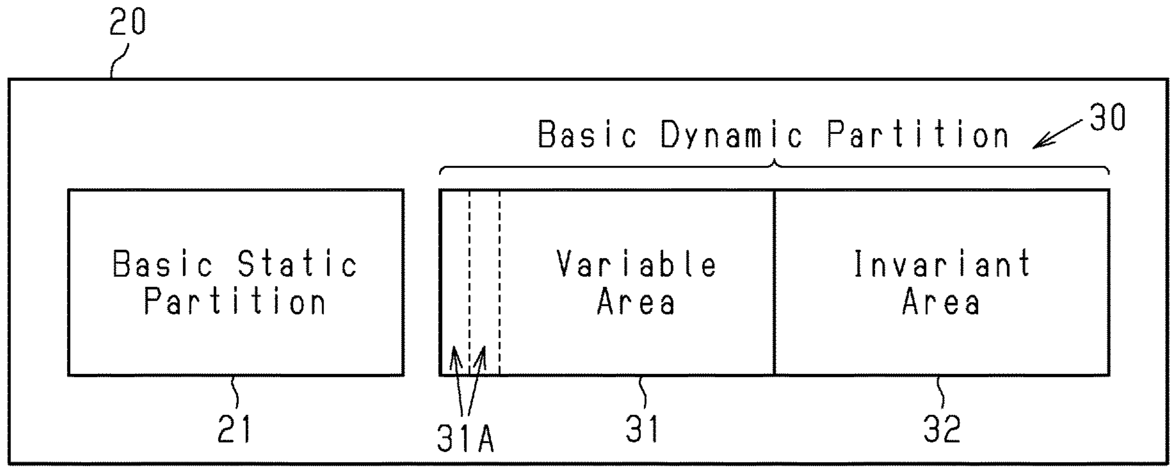
FIG. 2 is a diagram showing a configuration of a storage.

A configuration of the storage 20 at the time when the vehicle 100 is shipped from a factory, that is, a configuration in an initial state will now be described. As shown in FIG. 2, at the time of shipment of the vehicle 100, the storage 20 includes a basic static partition 21 and a basic dynamic partition 30.

The basic static partition 21 is a storage area allocated as a static partition at the time of shipment of the vehicle 100. The storage size of the basic static partition 21 is a first storage size. The first storage size is invariant over time. The first storage size is, for example, one third of the entire storage capacity of the storage 20.

Applications installed before shipment of the vehicle 100 are referred to as pre-shipment applications. At the time of shipment of the vehicle 100, multiple pre-shipment applications are stored in the basic static partition 21. More specifically, the basic static partition 21 is divided for the respective pre-shipment applications. The storage area for each pre-shipment application is a dedicated area for storing that pre-shipment application and data generated by the execution of the pre-shipment application.

An example of the pre-shipment applications is an application used to follow a preceding vehicle while maintaining a constant distance from the preceding vehicle. Another example of the pre-shipment applications is an application for automatically applying the brakes to reduce collision damage to the vehicle 100. The pre-shipment applications include, for example, a recording application for recording, in the storage 20, hydraulic pressures of the brake devices when the vehicle 100 is abruptly stopped. An individual identification number is attached to the header of each pre-shipment application stored in the basic static partition 21.

The basic dynamic partition 30 is a storage area allocated as a dynamic partition at the time of shipment of the vehicle 100. The storage size of the basic dynamic partition 30 is a second storage size. The second storage size is invariant over time. The second storage size is, for example, two thirds of the entire storage capacity of the storage 20.

A portion of the basic dynamic partition 30 is a variable area 31. The variable area 31 can be reallocated as a static partition from the dynamic partition. The variable area 31 has a predetermined storage size. The storage size is invariant over time. Hereinafter, a static partition reallocated from the dynamic partition will be referred to as an additional static partition 31A.

A portion of the basic dynamic partition 30 other than the variable area 31 is an invariant area 32. The invariant area 32 cannot be reallocated from the dynamic partition as the static partition. The invariant area 32 has a prescribed storage size. The prescribed storage size is invariant over time. Therefore, even when a portion or the entirety of the variable area 31 is reallocated as an additional static partition 31A, the storage size of the entire dynamic partition after the reallocation is greater than or equal to the prescribed storage size. The prescribed storage size is defined as a minimum storage size that needs to be maintained as the dynamic partition. The prescribed storage size is, for example, one third of the entire storage capacity of the storage 20.

Management Table

At the time of shipment of the vehicle 100, the storage 20 stores a management table in the basic static partition 21. The management table defines storage locations of data generated by the execution of applications. Specifically, the management table represents the correspondence between the identification numbers of the applications and storage locations of data generated by the execution of the applications.

The applications registered in the management table at the time of shipment of the vehicle 100, that is, the applications in the initial state are only the pre-shipment applications. In most of the pre-shipment applications, the storage location of data generated by the execution of the application is in the basic static partition 21. However, for some of the pre-shipment applications, the storage location of data generated by the execution of the application is in the dynamic partition.

A new application may be installed after the shipment of the vehicle 100. In this case, as will be described below, the CPU 11 stores the new application in the storage 20. When a new application is stored in the storage 20, the CPU 11 updates the management table. At this time, the CPU 11 designates the dynamic partition as the storage location of the data generated by the execution of the new application. Each time the CPU 11 stores a new application in the storage 20, the number of applications registered in the management table increases.

Outline of Storage Management Process

After the shipment of the vehicle 100, the CPU 11 can execute a storage management process. The storage management process executed by the CPU 11 to manage storage areas in the storage 20. The CPU 11 executes processes of the storage management process by causing the storage 20 to execute an application dedicated to the storage management process stored in the basic static partition 21.

The storage management process includes a basic process, an installation process, a post-shipment application process, and a pre-shipment application process. In the basic process, the CPU 11 deletes data from the dynamic partition when the prescribed time T has elapsed since the data was stored in the dynamic partition.

When a user requests installation of a new application, the CPU 11 performs the installation process. In the installation process, the CPU 11 reallocates a portion of the basic dynamic partition 30 as an additional static partition 31A. At this time, the CPU 11 reallocates a portion of the variable area 31. That is, the CPU 11 causes the storage size of the dynamic partition to be greater than or equal to the prescribed storage size after the reallocation.

When creating an additional static partition 31A, the CPU 11 allocates an area of which the storage size corresponds to the size of the new application as the additional static partition 31A. After performing the reallocation of the storage area, the CPU 11 stores the new application in the newly created additional static partition 31A. The new application is a post-shipment application, which is an application installed after the shipment of the vehicle 100.

After installation of the new post-shipment application, the CPU 11 can execute the post-shipment application. Then, the CPU 11 executes the post-shipment application process when executing the post-shipment application. In the post-shipment application process, the CPU 11 stores data generated by the execution of the post-shipment application in the dynamic partition at that point in time. That is, the CPU 11 stores the data generated by the execution of the post-shipment application in the invariant area 32 or in an area of the variable area 31 that has not yet been allocated as an additional static partition 31A.

The CPU 11 executes the pre-shipment application process when executing a pre-shipment application. In the pre-shipment application process, the CPU 11 stores the data generated by the execution of a pre-shipment application in an area of the basic static partition 21 that is dedicated to the executed pre-shipment application.

In the pre-shipment application process, the CPU 11 may store some of the generated data in the dynamic partition at that time depending on the type of the pre-shipment application.

Specific Manner of Installation Process

A flow of management of the storage 20 by the storage management process will be described as an operation of the present embodiment. A case in which the vehicle 100 has been shipped will now be described.

Figure 3:
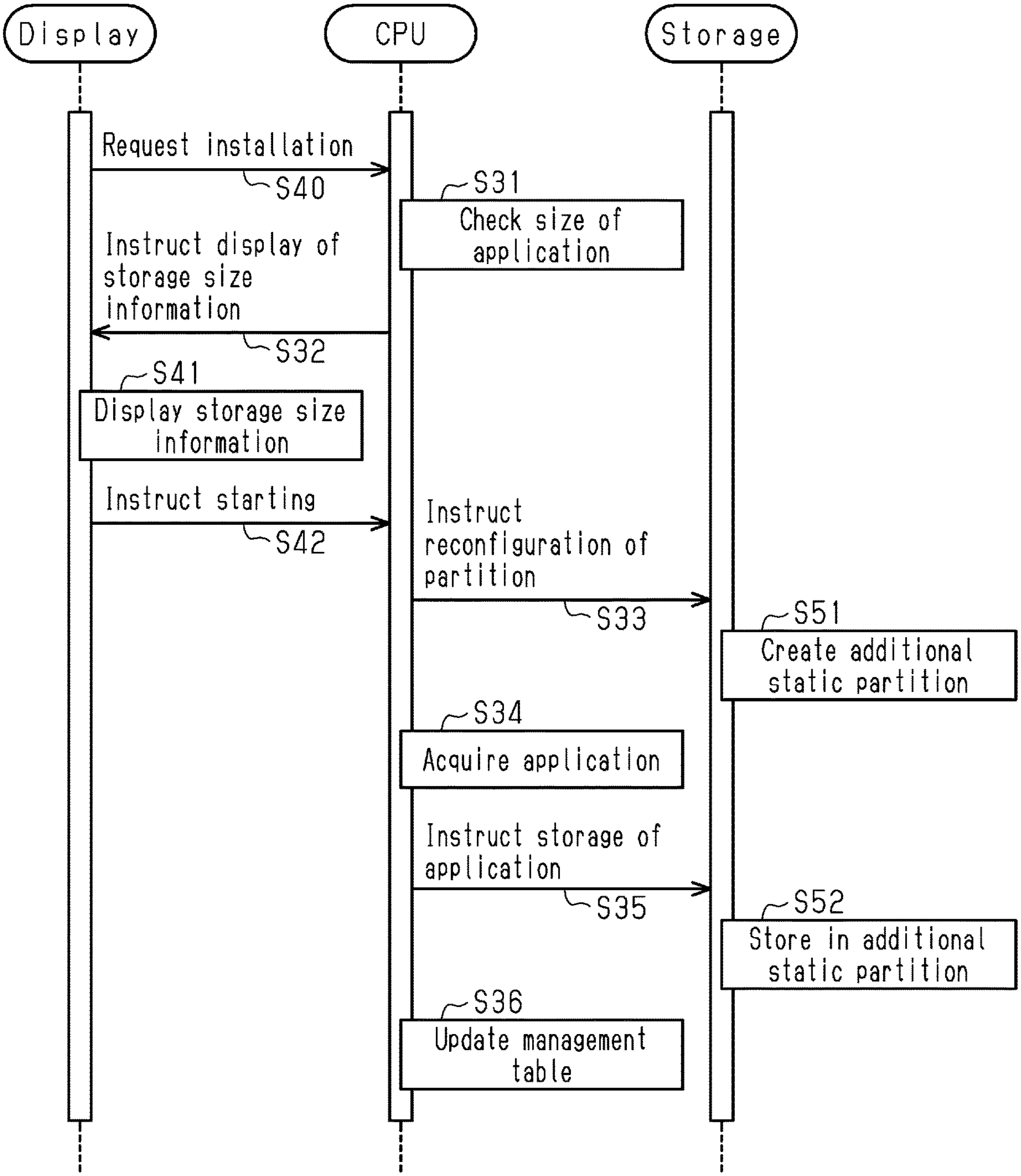
FIG. 3 is a sequence chart showing a flow of management of the storage shown in FIG. 2.

As shown in FIG. 3, when a user requests installation of a new application through the display 80 (step S40), the CPU 11 executes the installation process. In the installation process, the CPU 11 executes the processes of step S31, step S32, step S33, step S34, step S35, and step S36. In response to these processes, the storage 20 implements the functions of step S51 and step S52. Further, the display 80 implements the functions of step S41 and step S42.

When starting the installation process, the CPU 11 first performs the process of step S31. In step S31, the CPU 11 checks the storage size of an area required to store the new application desired by the user in the storage 20 (hereinafter, referred to as the size of the new application). At this time, the CPU 11 acquires information on the size of the new application from the external server 200. Thereafter, the CPU 11 advances the process of step S32.

In step S32, the CPU 11 sends a command signal for displaying storage size information to the display 80. The storage size information includes the size of the new application, the storage size of the remaining portion of the variable area 31 at the time of execution of step S32, and an icon for inquiring whether the user has made a final decision to install the new application. The remaining portion is a portion of the variable area 31 that has not yet been changed to the additional static partition 31A at the time of execution of step S32. Since the CPU 11 manages the partition configuration of the storage 20, the CPU 11 constantly monitors the remaining storage size of the variable area 31. Regarding the process of step S32, the CPU 11 includes, in the storage size information, information that the new application cannot be installed due to an insufficient storage size if the size of the new application is larger than the storage size of the remaining portion of variable area 31. In this case, installation of the new application is canceled.

In response to the process of step S32, the display 80 displays the storage size information in step S41. Thereafter, when the user requests installation of the application, the display 80 sends a signal instructing the start of installation to the CPU 11 in step S42. If the user does not request installation, the CPU 11 cancels the subsequent processes.

When receiving the signal instructing the start of installation, the CPU 11 executes the process of step S33. In step S33, the CPU 11 sends a command signal to the storage 20 to instruct the storage 20 to reconfigure the basic dynamic partition 30. The reconfiguration of the basic dynamic partition 30 is to reallocate a storage area in the variable area 31 that corresponds to the size of the new application as an additional static partition 31A. Upon receiving this command signal, the storage 20, in step S51, reallocates some or all of the remaining portion of the variable area 31 as an additional static partition 31A. As a result, the storage area of the basic dynamic partition 30 that is actually used as a dynamic partition becomes smaller than that before the reallocation.

After the process of step S33, the CPU 11 executes the process of step S34. In step S34, the CPU 11 obtains the new application from the external server 200. Thereafter, in step S35, the CPU 11 sends, to the storage 20, the new application and a command signal for storing the new application in the additional static partition 31A, which has been created by the command in step S33. At this time, the CPU 11 attaches an identification number dedicated to the new application to the header of the new application.

In response to the process of step S35, the storage 20 stores the post-shipment application, which is the new application, in the additional static partition 31A in step S52. Thereafter, the CPU 11 executes the process of step S36. In step S36, the CPU 11 updates the management table. The CPU 11 configures a dynamic partition as the storage location for data generated by the execution of the post-shipment application stored in the additional static partition 31A.

Although only one cycle of the installation process is illustrated in FIG. 3, the CPU 11 executes the installation process described above each time a request to install a new application is received. As a result, if the remaining portion necessary for installation of applications exists in the variable area 31, the number of post-shipment applications increases each time the CPU 11 executes the installation process.

Specific Manner of Basic Process

Figure 4:
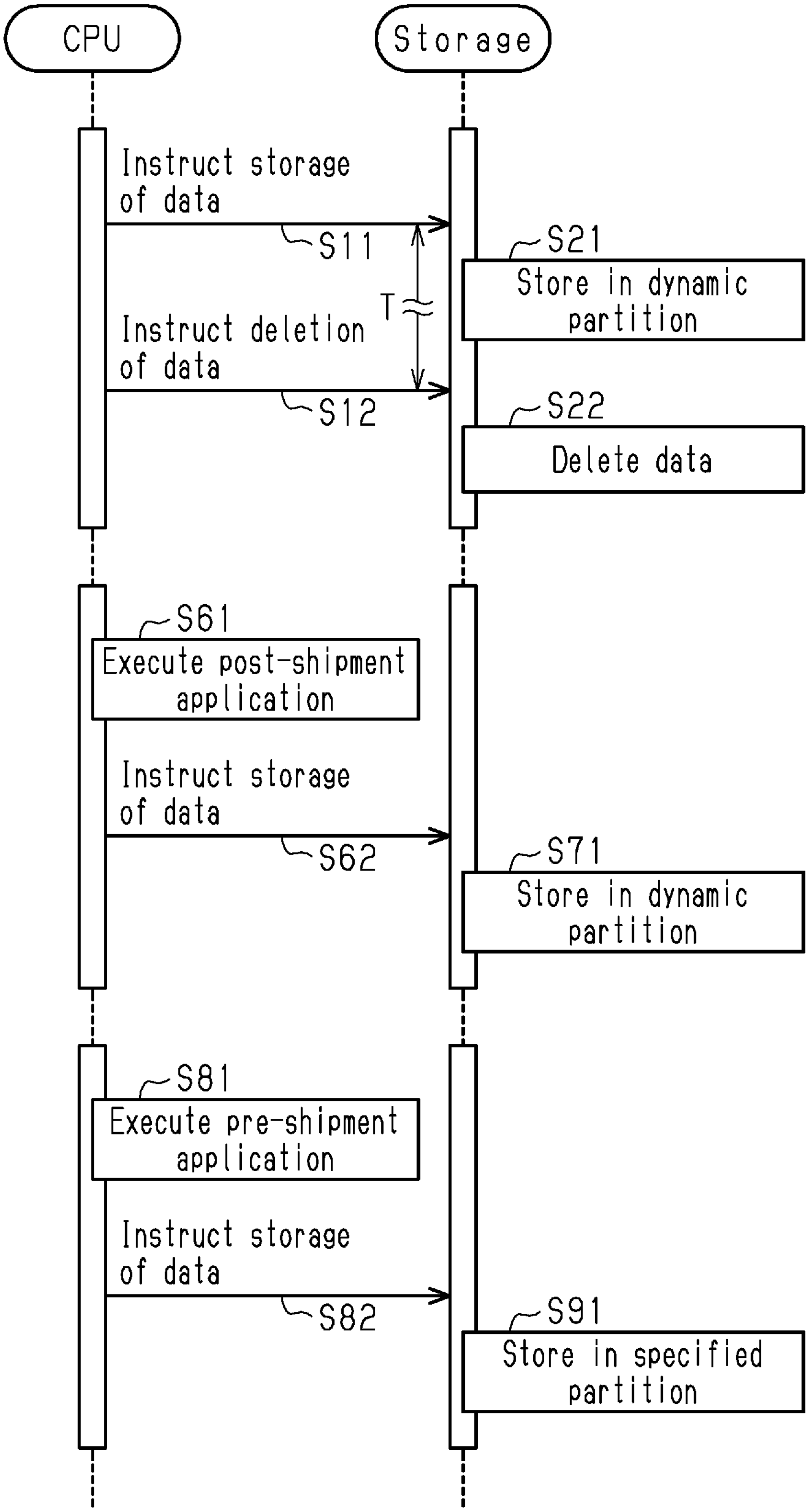
FIG. 4 is another sequence chart showing the flow of management of the storage shown in FIG. 2.

The CPU 11 executes the basic process when data to be stored in the dynamic partition of the storage 20 is generated by the execution of any one of various applications. As shown in FIG. 4, in the basic process, the CPU 11 performs the processes of step S11 and step S12. In response to these processes, the storage 20 implements the functions of step S21 and step S22.

When starting the basic process, the CPU 11 first executes the process of step S11. Specifically, in step S11, the CPU 11 sends, to the storage 20, data to be stored and a command signal for storing the data in the dynamic partition at that point in time. At this time, the CPU 11 timestamps the data to be stored with the current date and time. In response to the process of step S11, in step S21, the storage 20 stores the above-mentioned data in the dynamic partition at that point in time. When the prescribed time T elapses after the above-described data is stored in the storage 20, the CPU 11 executes the process of step S12.

In step S12, the CPU 11 sends a command signal to the storage 20 to delete the above-mentioned data. Upon receiving the command signal, the storage 20 deletes the stored data from the dynamic partition in step S22. The CPU 11 determines that the prescribed time T has elapsed by referring to the date and time included in data, for example. Although only one cycle of the basic process is illustrated in FIG. 4, the CPU 11 executes the basic process described above each time data to be stored in the dynamic partition of the storage 20 is generated.

Specific Manner of Post-Shipment Application Process

When the execution condition of any one of the post-shipment applications stored in the storage 20 is met, the CPU 11 executes the post-shipment application process for the post-shipment application for which the execution condition is met. The CPU 11 executes the processes of step S61 and step S62 in the post-shipment application process. In response to the process of step S62, the storage 20 implements the function of step S71.

When starting the post-shipment application process, the CPU 11 first executes the process of step S61. In step S61, the CPU 11 executes the post-shipment application for which the execution condition is met. When data is generated by the execution of the post-shipment application, the CPU 11 executes the process of step S62. In step S62, the CPU 11 refers to the management table to determine that the storage location of the generated data is the dynamic partition at that point in time. Then, the CPU 11 sends, to the storage 20, the generated data and a command signal for storing the data in the dynamic partition at that time point. In response to the process of step S62, in step S71, the storage 20 stores the data generated by the execution of the post-shipment application in the dynamic partition at that point in time. The process of step S62 described above is an example of step S11 of the basic process. Step S71 described above is an example of step S21. Although only one cycle of the post-shipment application process is illustrated in FIG. 4, the CPU 11 executes the above-described post-shipment application process each time the execution condition of the post-shipment application is met.

Specific Manner of Pre-Shipment Application Process

When the execution condition of any one of the pre-shipment applications stored in the storage 20 is met, the CPU 11 executes the pre-shipment application process for the pre-shipment application for which the execution condition is met. The CPU 11 executes the processes of step S81 and step S82 in the pre-shipment application process. In response to the process of step S82, the storage 20 implements the function of step S91.

When starting the pre-shipment application process, the CPU 11 first executes the process of step S81. In step S81, the CPU 11 executes the pre-shipment application for which the execution condition is met. When data is generated by the execution of the pre-shipment application, the CPU 11 executes the process of step S82. In step S82, the CPU 11 sends, to the storage 20, the generated data and a command signal for storing the data in a specified partition. The CPU 11 refers to the management table to select the basic static partition 21 or the dynamic partition at that point in time as the specified partition. In response to the process of step S82, in step S91, the storage 20 stores the data generated by the execution of the pre-shipment application in the specified partition. The process of step S82 when the CPU 11 selects the dynamic partition as the specified partition is an example of step S11 of the basic process. Step S91 in this case is an example of step S21. Although only one cycle of the pre-shipment application process is illustrated in FIG. 4, the CPU 11 executes the above-described pre-shipment application process each time the execution condition of the pre-shipment application is met.

Advantages of Embodiment (1) In the storage device management system described in the BACKGROUND section, access restrictions are provided for all partitions. Therefore, it is conceivable to secure a shared partition that can be freely written to without access restrictions, separate from a dedicated partition with access restrictions. In order to manage such a shared partition, it is conceivable to delete stored data when a certain period of time has elapsed since the data was stored so that the storage size allocated in advance can be efficiently reused.

As new data, an application may be downloaded. As described above, since the application is essential data for exhibiting the function of the application, prohibition of deletion is required. However, if the application is stored in the shared partition, the application may be deleted from the storage device after a certain period of time.

The storage management system of the present embodiment reduces the possibility that an application is deleted against the user's intention.

Specifically, when there is a request to install a new application, the CPU 11 reconfigures the storage area of the storage 20. That is, the CPU 11 reallocates a portion of the variable area 31 of the basic dynamic partition 30 as an additional static partition 31A. Then, the CPU 11 stores the post-shipment application, which is the new application, in the additional static partition 31A. This allows the storage 20 to continue to store the post-shipment application, while maintaining the dynamic partition in the storage 20, which deletes data every prescribed time T. This configuration reduces the possibility that the post-shipment application is deleted against the user's intention.

(2) When configuring an additional static partition 31A in the basic dynamic partition 30, the CPU 11 allocates only a storage size that corresponds to the size of the application to be newly installed to the additional static partition 31A. This allows the storage size of each additional static partition 31A to be relatively small. Therefore, even when a certain number of additional static partitions 31A are created, a large dynamic partition is secured after the allocation.

(3) When reallocating a portion of the basic dynamic partition 30 as an additional static partition 31A, the CPU 11 only uses a portion of the variable area 31. That is, the CPU 11 causes the storage size of the dynamic partition to be greater than or equal to the prescribed storage size after the reallocation. Therefore, if the prescribed storage size is set to be relatively large as in the present embodiment, it is possible to prevent the dynamic partition from being an excessively small area after the partition allocation.

Modifications

The above-described embodiment may be modified as follows. The above-described embodiment and the following modifications can be combined as long as the combined modifications remain technically consistent with each other.

The first storage size, the second storage size, and the prescribed storage size are not limited to the examples in the above-described embodiment. Depending on the content of the data to be stored in each partition, each of the above-mentioned storage sizes may be determined to ensure the required storage size is secured for each partition.

The storage size allocated as the additional static partition 31A may be larger than the size of the post-shipment application stored in the additional static partition 31A. The additional static partition 31A may store data generated by the execution of the post-shipment application. In this case, the management table may be set so as to achieve such a configuration.

The invariant area 32 may be omitted. The entire area of the basic dynamic partition 30 may be used as the variable area 31. In this case, the prescribed storage size is not determined. Even in this modification, if the storage size allocated as the additional static partition 31A corresponds to the size of an application, there is a low possibility that the dynamic partition becomes an excessively small area after the allocation of the additional static partitions 31A. Even if the basic dynamic partition 30 is allocated as the additional static partition 31A, each application can be executed if the following condition is met. The condition is that the additional static partition 31A and the basic static partition 21 have a dedicated area for storing data generated by the execution of the application.

For example, a storage size allocated as the additional static partition 31A may be changed for each post-shipment application in accordance with a user's instruction. The variable area 31 may include both an additional static partition 31A as which only a storage size corresponding to the size of a post-shipment application is allocated and an additional static partition 31A as which a storage size larger than the size of a post-shipment application is allocated. In this case, the storage size information displayed on the display 80 in step S41 may include an icon for setting the storage size. Then, in response to an instruction from the user, a storage size desired by the user may be allocated as the additional static partition 31A for each post-shipment application.

The input device that receives input from the user is not limited to the display 80. As the input device, a button or the like may be provided in the vehicle 100.

The storage of each specific controller 90 may be provided with a static partition and a dynamic partition similar to those in the above-described embodiment. Then, the CPU of the specific controller 90 may perform the storage management process.

The dynamic partition of the storage 20 may be used as a temporary storage area when the CPU 11 performs processing. In this case, the RAM 12 can be omitted from the central controller 10.

The storage 20 does not necessarily be a NAND-type nonvolatile memory, as in the above-described embodiment. For example, an entire storage medium in which a nonvolatile memory and other types of memory are integrated may be handled as the storage 20. Other types of memory are, for example, a RAM and a ROM. This modification is possible if the storage 20 includes a static partition and a dynamic partition as defined in the above-described embodiment.

The configuration of the central controller 10 is not limited to the example in the above-described embodiment. The central controller 10 may be modified as long as it includes a storage device that functions in the same manner as the storage 20 of the above-described embodiment, execution circuitry that functions in the same manner as the that in the above-described embodiment, and any one of the following configurations.

(a) The central controller 10 includes one or more processors that execute various processes according to instructions of computer programs. The processor includes a CPU and a memory such as RAM and ROM. The memory stores program code or instructions configured to cause the CPU to perform operations. The memory, which is a non-transitory computer-readable storage medium, includes any type of storage media that are accessible by general-purpose computers and dedicated computers.

(b) The central controller 10 includes one or more dedicated hardware circuits that execute various processes. The dedicated hardware circuits include, for example, an application specific integrated circuit (ASIC) and a field programmable gate array (FPGA).

(c) The central controller 10 includes a processor that executes part of various processes according to programs and a dedicated hardware circuit that executes the remaining processes.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A vehicle storage management system, comprising:
execution circuitry; and
a storage, wherein
the storage includes:
a dynamic partition allocated in advance as a storage area from which data is deleted when a prescribed time elapses after the data is stored; and
a static partition allocated in advance as a storage area in which stored contents are not deleted even when the prescribed time elapses,
the execution circuitry is configured to
delete data from the dynamic partition when the prescribed time has elapsed since the data was stored in the dynamic partition,
reallocate a portion of the dynamic partition as an additional static partition when there is a request to install a new application, and
store the new application in the additional static partition, and
a storage size of the additional static partition is invariant over time.

2. The vehicle storage management system according to claim 1, wherein
when there is the request, the execution circuitry allocates a portion of the dynamic partition as the additional static partition and stores the new application in the additional static partition, a storage size of the allocated portion corresponding to a size of the new application, and
when the new application is executed, the execution circuitry stores data generated by execution of the new application in the dynamic partition.

3. The vehicle storage management system according to claim 1, wherein, when reallocating a portion of the dynamic partition as the additional static partition, the execution circuitry causes a storage size of the dynamic partition after the reallocation to be greater than or equal to a prescribed storage size.

4. A non-transitory computer-readable storage medium that stores a program that includes instructions to be executed by a vehicle storage management system that includes an execution circuitry, the storage medium comprising:
a dynamic partition allocated in advance as a storage area from which data is deleted when a prescribed time elapses after the data is stored; and
a static partition allocated in advance as a storage area in which stored contents are not deleted even when the prescribed time elapses, wherein
the instructions cause the execution circuitry to
delete data from the dynamic partition when the prescribed time has elapsed since the data was stored in the dynamic partition,
reallocate a portion of the dynamic partition as an additional static partition when there is a request to install a new application, and
store the new application in the additional static partition, and
a storage size of the additional static partition is invariant over time.

5. A storage management method performed by a vehicle storage management system, wherein
the storage management system includes:
an execution circuitry; and
a storage,
the storage includes:
a dynamic partition allocated in advance as a storage area from which data is deleted when a prescribed time elapses after the data is stored; and
a static partition allocated in advance as a storage area in which stored contents are not deleted even when the prescribed time elapses,
the storage management method includes causing the execution circuitry to
delete data from the dynamic partition when the prescribed time has elapsed since the data was stored in the dynamic partition,
reallocate a portion of the dynamic partition as an additional static partition when there is a request to install a new application, and
store the new application in the additional static partition, and
a storage size of the additional static partition is invariant over time.

6. The vehicle storage management system according to claim 1, wherein the additional static partition is configured such that the new application, once written to the additional static partition, is non-deleted and stored semipermanently.

7. The non-transitory computer-readable storage medium according to claim 4, wherein the additional static partition is configured such that the new application, once written to the additional static partition, is non-deleted and stored semipermanently.

8. The storage management method according to claim 5, wherein the additional static partition is configured such that the new application, once written to the additional static partition, is non-deleted and stored semipermanently.

* * * * *